(No Model.)

O. A. SUTHERLAND.
FENDER OR GUARD FOR TRAM CARS.

No. 595,356. Patented Dec. 14, 1897.

WITNESSES

INVENTOR
Owen A. Sutherland
BY Edgar Tate & Co
ATTORNEYS.

UNITED STATES PATENT OFFICE.

OWEN ALEXANDER SUTHERLAND, OF KEELER, CALIFORNIA.

FENDER OR GUARD FOR TRAM-CARS.

SPECIFICATION forming part of Letters Patent No. 595,356, dated December 14, 1897.

Application filed July 3, 1897. Serial No. 643,331. (No model.)

*To all whom it may concern:*

Be it known that I, OWEN ALEXANDER SUTHERLAND, a citizen of the United States, residing at Keeler, in the county of Inyo and State of California, have invented certain new and useful Improvements in Fenders or Guards for Tramway-Cars, of which the following is a full and complete specification, such as will enable those skilled in the art to which it appertains to make and use the same.

This invention relates to fenders or guards for tramway-cars; and the object thereof is to provide an improved device of this class which is simple in construction and operation and which is designed to prevent the serious and sometimes fatal injury or injuries which result from the striking of a person or object by a car when in motion.

The invention is fully disclosed in the following specification, of which the accompanying drawings form a part, in which—

Figure 1:
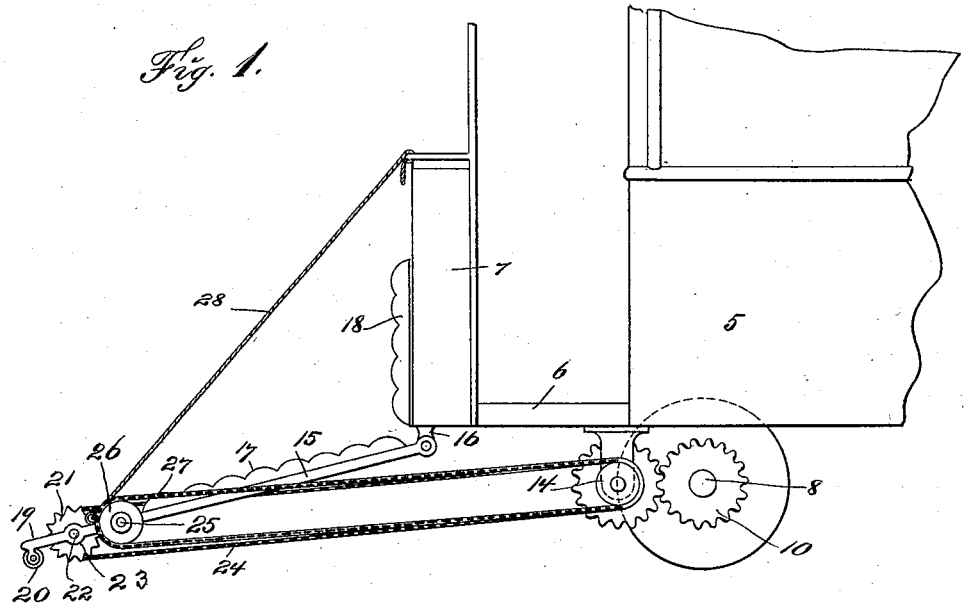
Figure 2:
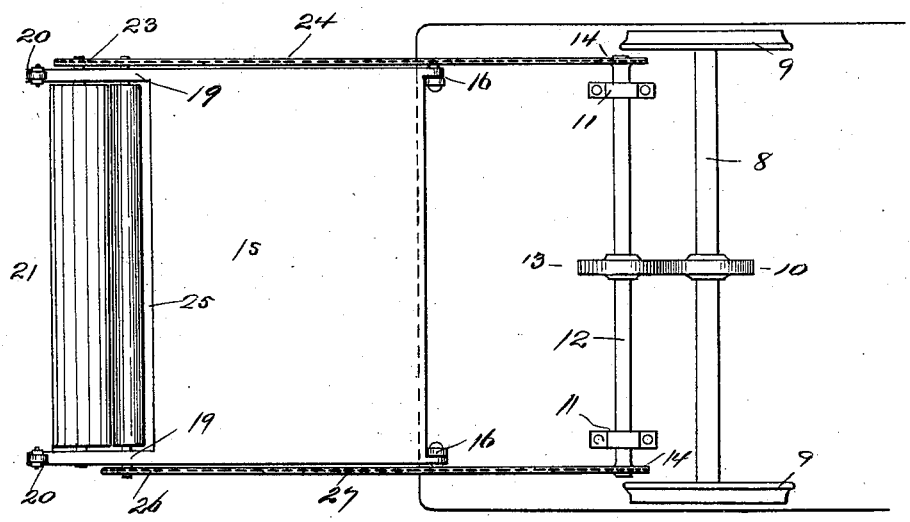

Figure 1 is a side view of a tramway-car provided with my improved fender or guard, and Fig. 2 a bottom plan view thereof.

In the drawings forming part of this specification the separate parts of my improvement are designated by the same numerals of reference in each of the views, and in said drawings I have shown the end of a car at 5, which is provided with a platform 6 and a detachable board 7, and I have also shown one of the shafts or axles 8, which is provided with the usual wheels 9 and centrally thereof with a gear-wheel 10.

Secured to the bottom of the platform 6, in front of the shaft or axle 8, are hangers 11, which support a shaft 12, which is provided centrally with a gear-wheel 13, which operates in connection with the gear-wheel 10 and shaft or axle 11, and said shaft 12 is also provided at each end with a sprocket-wheel 14, and I also provide a fender or guard which consists of a suitable upholstered frame or board 15, which is pivotally connected with hangers 16, secured to the front of the platform 6 at each side thereof, and the upper portion of said frame or board 15 is preferably upholstered, as shown at 17, by means of any suitable material, and the front of the detachable board 7 is also preferably provided with similar upholstering material, as shown at 18.

The forward end of the plate or frame 15 of the fender or guard is provided at each side with projecting arms 19, with the under sides of the forward ends of which are connected wheels or rollers 20, which are adapted to bear upon the ground, and mounted in the forward ends of said arms is a roller 21, which is mounted on a shaft 22, one end of which is provided with a sprocket-wheel 23, which is geared in connection with one of the sprocket-wheels on the shaft 12 by a driving-chain 24, and rearwardly of the roller 23 is a supplemental roller 25, one end of which is provided with a sprocket-wheel 26, which is geared in connection with one of the sprocket-wheels on the shaft 12 by a driving-chain 27. By this arrangement both of the rollers 21 and 25 are revolved backwardly or in a direction opposite to that of the shaft or axle of the car, and the roller 21 is composed of rubber or similar material and is preferably longitudinally ribbed or grooved, and the roller 27 is also preferably composed of rubber or rubber and canvas or similar material.

In the normal position of the parts the front end of the fender or guard is supported by the wheels or rollers 20, which rest upon the ground, or said fender or guard may be supported by rods, cords, or chains 28, which are connected with the arms 19 of the fender or guard and with the upper portion of the detachable board, or both of these devices may be provided, and it will be apparent that by raising the rods, cords, or chains 28 the forward end of the fender or guard may be raised so as to be held at any desired position.

The operation will be readily understood from the foregoing description when taken in connection with the accompanying drawings and the following statement thereof.

If a person or object should be struck by the fender or guard while the car is in motion, said person or object will be thrown backwardly onto the fender or guard by means of the rollers 21 and 25, and said rollers being composed of rubber, rubber and canvas, or similar material the force of the blow would be reduced and comparatively no injury would result therefrom, and the passage of such person or object beneath the car would thus be avoided.

My improved fender or guard is simple in construction and operation and is perfectly adapted to accomplish the result for which it is intended; and it will be apparent that changes in and modifications of the construction herein described may be made without departing from the spirit of my invention or sacrificing its advantages.

Having fully described my invention, I claim as new and desire to secure by Letters Patent—

1. The combination with the shaft or axle of a car, of a gear-wheel mounted thereon, a supplemental shaft mounted in front of said shaft or axle, and provided with a gear-wheel, and with sprocket-wheels at its opposite ends, a fender or guard pivotally suspended from beneath the platform of the car, and provided at its front end with a roller, the shaft of which is provided with a sprocket-wheel which is geared in connection with one of the sprocket-wheels on the supplemental shaft, and a supplemental roller mounted in the rear of the first-named roller, and the shaft of which is also provided with a sprocket-wheel which is geared in connection with one of the sprocket-wheels, on the supplemental shaft, substantially as shown and described.

2. The combination with the shaft or axle of a car, of a gear-wheel mounted thereon, a supplemental shaft mounted in front of said shaft or axle, and provided with a gear-wheel, and with sprocket-wheels at its opposite ends, a fender or guard pivotally suspended from beneath the platform of the car, and provided at its front end with a roller, the shaft of which is provided with a sprocket-wheel which is geared in connection with one of the sprocket-wheels on the supplemental shaft, and a supplemental roller mounted in the rear of the first-named roller, and the shaft of which is also provided with a sprocket-wheel which is geared in connection with one of the sprocket-wheels on the supplemental shaft, and means for supporting the front end of the fender or guard, substantially as shown and described.

3. The combination with the forward end of the platform of a car, of a fender or guard pivotally suspended beneath the same, and provided with supports for the front end thereof, rollers mounted in the front end of said fender or guard, the shafts of which are provided at opposite ends with sprocket-wheels, a supplemental shaft mounted in front of one of the shafts or axles of the car, and geared in connection therewith said supplemental shaft being provided at its opposite ends with sprocket-wheels which are geared in connection with those on said rollers, substantially as shown and described.

In testimony that I claim the foregoing as my invention I have signed my name, in presence of the subscribing witnesses, this 21st day of June, 1897.

OWEN ALEXANDER SUTHERLAND.

Witnesses:
F. B. BULMER,
ALBERT DUNCAN SCHIVELEY.